United States Patent
Wiedner et al.

(10) Patent No.: US 11,285,804 B2
(45) Date of Patent: Mar. 29, 2022

(54) VENTING DEVICE FOR VENTING A MOTOR VEHICLE TANK

(71) Applicant: MAGNA STEYR Fuel Systems GesmbH, Sinabelkirchen (AT)

(72) Inventors: Patrick Michael Wiedner, Hartberg (AT); Dominik Steinmann, Stubenberg (AT); Karl-Heinz Kulmer, Gleisdorf (AT)

(73) Assignee: MAGNA Energy Storage Systems GesmbH, Sinabelkirchen (AT)

( * ) Notice: Subject to any disclaimer, the term of this patent is extended or adjusted under 35 U.S.C. 154(b) by 0 days.

(21) Appl. No.: 16/869,714

(22) Filed: May 8, 2020

(65) Prior Publication Data
US 2020/0361308 A1    Nov. 19, 2020

(30) Foreign Application Priority Data

May 15, 2019   (EP) .................................... 19174646

(51) Int. Cl.
*B60K 15/035*    (2006.01)
*B60K 15/03*    (2006.01)

(52) U.S. Cl.
CPC ............... *B60K 15/03519* (2013.01); *B60K 2015/03236* (2013.01); *B60K 2015/03538* (2013.01); *B60K 2015/03552* (2013.01)

(58) Field of Classification Search
CPC .... B60K 15/03519; B60K 2015/03236; B60K 2015/03538; B60K 2015/03552

(Continued)

(56) References Cited

U.S. PATENT DOCUMENTS

| 403,704 A | * | 5/1889 | Stuart | ................... B01D 45/02 137/171 |
| 3,698,160 A | * | 10/1972 | Hunter | ............. B60K 15/03519 55/385.3 |

(Continued)

FOREIGN PATENT DOCUMENTS

| DE | 19605922 A1 | 8/1996 |
| DE | 202008001586 U1 | 6/2008 |

(Continued)

OTHER PUBLICATIONS

European Search Report for European Patent Application No. 19174646.0, dated Dec. 16, 2019, 4 pages.

*Primary Examiner* — Timothy L Maust
*Assistant Examiner* — James R Hakomaki
(74) *Attorney, Agent, or Firm* — Jordan IP Law, LLC; Todd A. Vaughn

(57) ABSTRACT

A ventilation device for ventilating a motor vehicle tank. The ventilation device includes a filler pipe, a ventilation line, a degassing line, and a guide arc member. The ventilation line is to be fluidically connected at a first ventilation line end to the motor vehicle tank, and at a second ventilation line end to the filler pipe via a ventilation inlet. The degassing line is to be fluidically connected at a first degassing line end to the filler pipe via a degassing outlet. The guide arc member is arranged in the filler pipe to define a guide path for incoming vapor passing through the ventilation inlet into the filler pipe. The guide arc member is to facilitate flow of the incoming vapor between an inner wall of the filler pipe and the guide arc member along a periphery of the filler pipe along a periphery of the filler pipe such that a gaseous component of the incoming vapor escapes through the degassing outlet and a liquid component of the incoming vapor flows off through the filler pipe.

15 Claims, 2 Drawing Sheets

(58) Field of Classification Search
USPC .......................................................... 137/199
See application file for complete search history.

(56) References Cited

U.S. PATENT DOCUMENTS

| | | | | |
|---|---|---|---|---|
| 3,753,443 | A * | 8/1973 | Sorimachi | B60K 15/03504 137/255 |
| 4,651,889 | A * | 3/1987 | Uranishi | B60K 15/04 123/519 |
| 4,699,638 | A * | 10/1987 | Harris | B60K 15/03504 96/113 |
| 4,701,198 | A * | 10/1987 | Uranishi | B01D 19/0063 123/519 |
| 4,706,708 | A * | 11/1987 | Fornuto | B60K 15/03519 137/588 |
| 4,926,914 | A * | 5/1990 | Morizumi | B60K 15/03519 123/519 |
| 4,934,417 | A | 6/1990 | Bucci | |
| 5,027,868 | A * | 7/1991 | Morris | B60K 15/04 141/59 |
| 5,033,517 | A * | 7/1991 | Bucci | B60K 15/0406 141/59 |
| 5,103,877 | A * | 4/1992 | Sherwood | B60K 15/03519 123/519 |
| 5,116,257 | A * | 5/1992 | Szlaga | B60K 15/03519 137/43 |
| 5,740,842 | A * | 4/1998 | Maier | B60K 15/03519 137/588 |
| 5,868,119 | A * | 2/1999 | Endo | F02M 33/02 123/516 |
| 6,405,747 | B1 * | 6/2002 | King | B60K 15/03519 137/202 |
| 6,425,379 | B2 * | 7/2002 | Shimamura | B60K 15/03519 123/516 |
| 6,880,586 | B2 * | 4/2005 | Crowley | B60K 15/04 141/286 |
| 7,152,638 | B2 * | 12/2006 | Ganachaud | B60K 15/03504 141/198 |
| 7,770,594 | B2 * | 8/2010 | Kishi | F16K 24/044 137/202 |
| 9,248,735 | B2 * | 2/2016 | Walter | B60K 15/03504 |
| 9,457,649 | B2 * | 10/2016 | Fujiwara | B60K 15/04 |
| 10,035,091 | B2 * | 7/2018 | Takahashi | G05D 7/01 |
| 10,245,942 | B2 * | 4/2019 | Hagen | B60K 15/04 |
| 10,267,275 | B2 * | 4/2019 | Mihara | F16K 24/044 |
| 10,465,634 | B2 * | 11/2019 | Vulkan | F02M 25/08 |
| 10,857,876 | B2 * | 12/2020 | Myers | F15D 1/0005 |
| 2002/0189691 | A1 | 12/2002 | Morinaga | |
| 2009/0025822 | A1 * | 1/2009 | Rittershofer | B60K 15/03519 141/45 |
| 2010/0147863 | A1 * | 6/2010 | Grun | B60K 15/04 220/746 |
| 2016/0272061 | A1 * | 9/2016 | Schallmo | B60K 15/03504 |
| 2016/0325619 | A1 * | 11/2016 | Le Mat | B60K 15/04 |

FOREIGN PATENT DOCUMENTS

DE 102009057860 A1 6/2011
EP 1955888 A2 8/2008

* cited by examiner

VENTING DEVICE FOR VENTING A MOTOR VEHICLE TANK

CROSS-REFERENCE TO RELATED APPLICATIONS

The present application claims priority 35 U.S.C. § 119 to European Patent Publication No. EP 19174646.0 (filed on May 15, 2019), which is hereby incorporated by reference in its entirety.

TECHNICAL FIELD

Embodiments relate to a ventilation device for ventilating a motor vehicle tank.

BACKGROUND

It is known to ventilate motor vehicle tanks, that is to say tanks in motor vehicles, in particular tanks for the fuel for propelling the motor vehicle, such as petrol or diesel fuel, by an operating ventilation during operation of the motor vehicle. The operating ventilation is generally realized at one or more highest points on the motor vehicle tank. The evacuated gas can be conducted into a fuel vapor filter, in particular an activated charcoal filter, in order to release the least possible hydrocarbons into the environment. For the refueling of the motor vehicle tank, a dedicated refueling ventilation system can be provided, wherein the gas released during the refueling ventilation is also conducted into the activated charcoal filter.

In order to avoid damage to the activated charcoal filter, it is known to separate the fuel vapor flowing in the ventilation lines via a liquid separator, so that liquid is separated off and can flow back into the tank and only gas makes its way to the activated charcoal filter. Such liquid separators can be arranged in the ventilation lines in the form of dedicated intermediate reservoirs. More recently, it has also been known to configure liquid separators directly in a connecting nipple of the filler pipe, so that separated-off liquid can make its way directly into the filler pipe and can flow off via the filler pipe. Separating nipples of this type require only a small installation space and the separated-off liquid can be easily led off.

From EP 1955888 A2, a liquid vapor separator for the fuel system of a vehicle is known, wherein the liquid vapor separator comprises a body having an inlet, which is connectable to a ventilation system of a fuel tank, and having a vapor outlet, which is connectable to a fuel vapor treatment device, and further comprises a condensation chamber for the condensation of fuel droplets, wherein the condensation chamber is fluidically connected to the inlet and the outlet, and wherein in the condensation chamber is arranged a droplet separator, which comprises a partition wall, and the condensation chamber extends on a filler neck of the fuel system.

During travel, and also in the course of so-called instant venting operations, for example for an immediate pressure reduction after actuation of a tank flap unlocking mechanism of a hybrid vehicle, in the ventilation system can arise excessive gas volume flows, which can also exhibit a high saturation of liquid fuel.

Known separating nozzles on the filler pipe can barely cope with higher gas volume flows of this kind, in particular due to the small operating volume of such separators. Too low a degree of separation can, however, lead to an increased loading, or even a destruction, of the fuel vapor filter, in particular, the activated charcoal filter.

SUMMARY

Embodiments relate to a ventilation device for ventilating a motor vehicle tank, which ventilation device functions reliably even under high gas volume flows, yet, at the same time, has a small installation space and low manufacturing costs.

In accordance with embodiments, a ventilation device for ventilating a motor vehicle tank, may comprise at least one of: a filler pipe; a ventilation line for fluidic connection at a first ventilation line end to the motor vehicle tank, and at a second ventilation line end opposite the first end, to the filler pipe via a ventilation inlet; and a degassing line for fluidic connection at a first degassing line end to the filler pipe via a degassing outlet; a guide arc arranged in the filler pipe and shaped to guide incoming vapor passing through the ventilation inlet into the filler pipe between an inner wall of the filler pipe and the guide arc along a periphery of the filler pipe, so that a gaseous component of the incoming vapor escapes through the degassing outlet and a liquid component of the incoming vapor flows off through the filler pipe.

In accordance with embodiments, the ventilation inlet is arranged to lay, in an installation position, at a top region of the filler pipe.

In accordance with embodiments, the degassing outlet is arranged to lay, in an installation position, at a top region of the filler pipe.

In accordance with embodiments, gas flow from a ventilation line, in particular, an operating ventilation line, for separating off the contained liquid is conducted to a filler pipe. However, separation is not realized in a connecting nipple on the filler pipe, but in the filler pipe itself. The greater volume of the filler pipe is therefore utilized as the operating volume for the separation. For this, the gas volume flow is guided via the ventilation line up to a ventilation inlet on the filler pipe, which, in the installation position, is configured at the top, so that the fuel vapor mixture can fall into the filler pipe.

In accordance with embodiments, the movement of the vapor is guided by a guide arc. The guide arc is a component having an arcuate or curvilinear cross-section to facilitate flow of vapor peripherally, substantially in a circular arc shape, through the cross-section of the filler pipe, in particular, of the filler head. In that way, only the gaseous component of the vapor rises to flow via the degassing outlet (i.e., an additional opening) which therefore is likewise, in the installation position, arranged at the top region, and onward via a degassing line. In that way, the vapor flows in the direction of a fuel vapor filter which may comprise an activated charcoal filter. The liquid fuel rises along the flow path defined by the guide arc to short of the degassing outlet and therefore runs off, via the filler pipe, in the direction towards the motor vehicle tank.

Due to the high operating volume, this ventilation device, even under high gas volume flows and with high liquid quantity, can achieve a reliable separation of liquid fuel and herein uses volumes and components of the filler pipe, so that the additional installation space and the manufacturing costs are low.

In accordance with embodiments defined in this patent disclosure, the terms "top" and "bottom" relate to the gravitational direction, so that, for instance, liquid falls from "top" to "bottom."

In accordance with embodiments, a plurality of ribs are arranged on an outer wall of the guide arc that faces the inner wall of the filler pipe and configured for separating off the liquid. The ribs may be configured only on a portion of the guide arc, in particular, only on a first half of the guide arc that guides the entering vapor downwards.

In accordance with embodiments, the cross-section of the guide arc is preferably of substantially U-shaped or O-shaped configuration. The guide arc can be of multipart construction.

In accordance with embodiments, a moveable flap member is arranged in the filler pipe at the degassing outlet, so that, when a fuel-pump nozzle is introduced into the filler pipe, the flap member is moved by the fuel-pump nozzle in a closing direction. In that way, the overall area of the degassing outlet, during a refueling of the motor vehicle tank, is reduced or closed. During the refueling, vapor making its way through the ventilation inlet therefore flows off in full, or, for instance, except for a predefined quantity, only through the filler pipe.

In accordance with embodiments, the ventilation inlet and the degassing outlet are configured on a common connecting nipple on the filler pipe.

In accordance with embodiments, the guide arc is preferably configured on the common connecting nipple. In particular, the guide arc can be fastened to the connecting nipple, or the guide arc and the connecting nipple are configured as a one piece or unitary component.

Alternatively, in accordance with embodiments, the ventilation device can comprise a flow-guide for the positioning of a fuel-pump valve and for the guidance of a refueling flow, and the guide arc can be configured as a structural portion of the flow-guide.

In accordance with embodiments, the degassing line, at a second degassing line end opposite the first degassing line end, is fluidically connected to a liquid separator and/or to a fuel vapor filter comprising an activated charcoal filter.

In accordance with embodiments, the degassing line, at the second degassing line end, is firstly fluidically connected to the liquid separator and, via the liquid separator, to the fuel vapor filter comprising an activated charcoal filter. The gas passing out through the degassing line is therefore once again further treated via a further liquid separator, preferably separate from the filler pipe, before making its way to the activated charcoal filter. The liquid separator can be utilized also for a further function, in particular, for the separation in a separate refueling ventilation system.

In accordance with embodiments, a second ventilation line, in particular, a refueling ventilation line, fluidically connects the motor vehicle tank directly to the liquid separator.

In accordance with embodiments, a second degassing line fluidically connects the liquid separator to the fuel vapor filter.

DRAWINGS

Embodiments will be illustrated by way of example in the drawings and explained in the description hereinbelow.

DESCRIPTION

Figure 1:
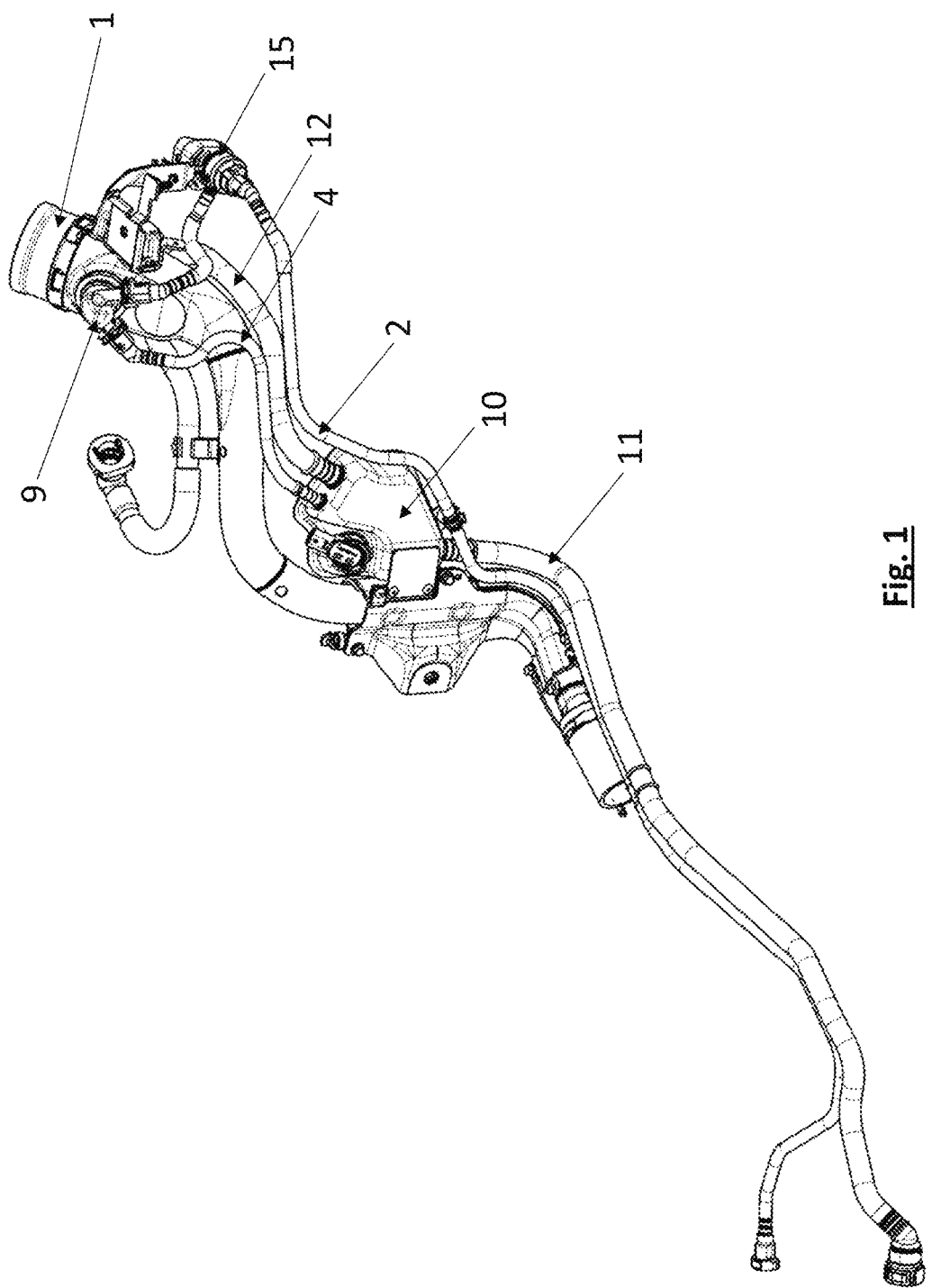
FIG. 1 illustrates a three-dimensional view of a ventilation device in accordance with embodiments.

In FIG. 1, a ventilation device for ventilating a motor vehicle tank, in particular, a fuel tank, is represented, in accordance with embodiments.

The ventilation device comprises a filler pipe 1 and a ventilation line 2 to serve as an operating ventilation line. The ventilation line 2, at a first ventilation line end, is to be fluidically connected to the motor vehicle tank (See, FIG. 1 the lower end of the ventilation line 2). The ventilation line 2 is to be fluidically connected at a second ventilation line end opposite the first end, downstream of a valve unit 15, to the filler pipe 1 via a connecting nipple 9, at a ventilation inlet 3 represented in FIG. 3.

The ventilation device further comprises a degassing line 4 to serve as a recirculating line. The degassing line 4, at a first degassing line end, is to be fluidically connected to the filler pipe 1 via the same connecting nipple 9, at a degassing outlet 5 represented in FIG. 3. The degassing line 4, at a second degassing line end opposite the first end, is to be fluidically connected to a liquid separator 10 which is to serve as a so-called "liquid trap." The ventilation inlet 3 and the degassing outlet 5 are configured on the common connecting nipple 9 on the filler pipe 1.

The ventilation inlet 3 is positioned, in an installation position, at a top region of the filler pipe, so that vapor can fall though the ventilation inlet 3 into the filler pipe 1. The degassing outlet 5 is also positioned, in the installation position, at the top region of the filler pipe 1, or at least not close to the bottom of the filler pipe 1, in order that only a gaseous component, but not liquid fuel, makes its way up to the degassing outlet 5.

A second degassing line 12 fluidically connects the liquid separator 10 to a fuel vapor filter comprising an activated charcoal filter. In this context, in FIG. 1 (at the top, on the left next to the connecting nipple 9) is merely represented that end of the second degassing line 12 that is to be connected to the fuel vapor filter, not the fuel vapor filter itself.

A second ventilation line 11, namely a refueling ventilation line, which has a greater diameter than the ventilation line 2, fluidically connects the motor vehicle tank directly to the liquid separator 10.

Figure 2:
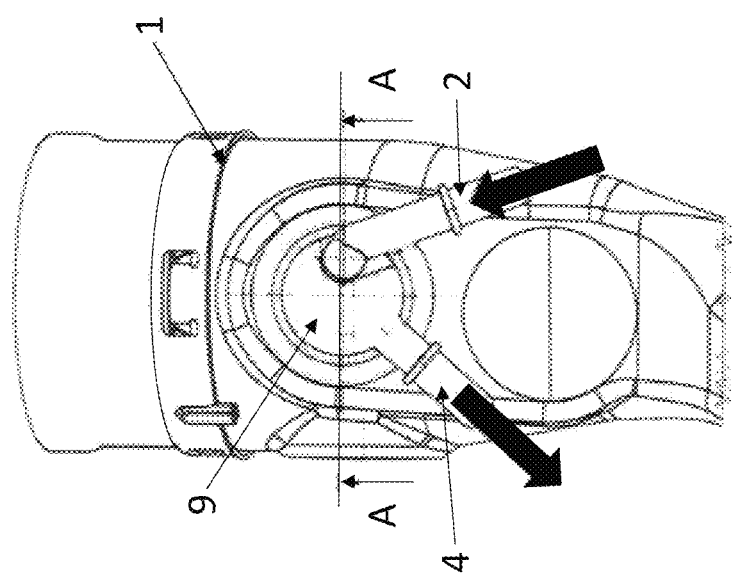
FIG. 2 illustrates a partial top view, which shows the filler pipe of the ventilation device of FIG. 1 in the region of the connecting nipple.

The connecting nipple 9 is more closely represented in the detail in FIG. 2. The section A-A which is marked in FIG. 2 is represented in FIG. 3.

Figure 3:
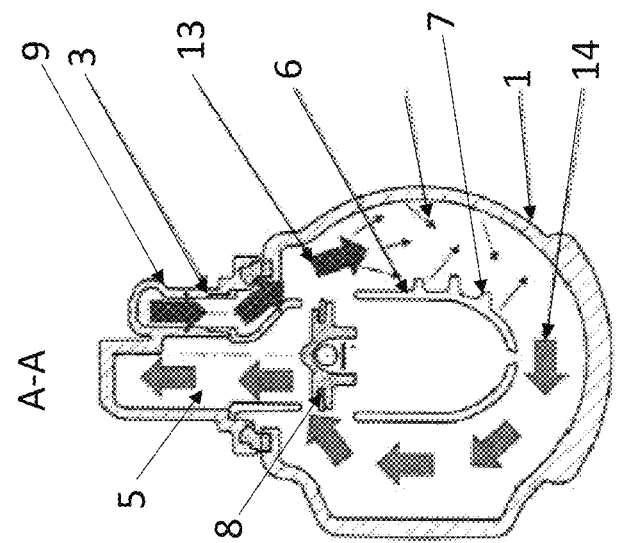
FIG. 3 illustrates a sectional view according to section A-A of FIG. 2.

In the filler pipe 1, a guide arc 6 is arranged and shaped such that a vapor passing through the ventilation inlet 3 into the filler pipe 1, which vapor, the arrowed entering fuel-gas-mixture 13, is guided between the inner wall of the filler pipe 1 and the guide arc 6 along the periphery of the filler pipe 1, so that a gaseous component of the entering vapor, again marked by arrows as the gas 14, escapes through the degassing outlet 5 and a liquid component of the entering vapor flows off through the filler pipe 1 (in FIG. 3 in the direction towards the observer).

The guide arc 6 is configured, for instance, in the shape of a cylindrical segment or conical segment or funnel. On an outer wall of the guide arc 6 that faces the inner wall of the filler pipe 1 are configured, in some sections, a plurality of ribs 7 for separating off the liquid. The guide arc 6 is configured substantially as a profile of U-shaped or O-shaped cross-section.

In the filler pipe 1, a flap member 8 is arranged at the degassing outlet 5. The flap member 8 is mounted such that it is axially displaceable or moveable. When a fuel-pump nozzle is introduced into the filler pipe 1, the flap member 8 is moved by the fuel-pump nozzle in a closing direction, and thus the degassing outlet 5, during a refueling of the motor vehicle tank, is made smaller or closed.

The guide arc 6 is fastened at its upper ends, the ends of the branches of the U-shape, to the common connecting nipple 9, or the guide arc 6 forms a portion of a flow guide of the ventilation device, for the positioning of a fuel-pump valve or fuel-pump nozzle and for the guidance of the fluid flow during the refueling of the motor vehicle tank. The guide arc 6 can also form the valve seat for the flap member 8.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS

1 filler pipe
2 ventilation line
3 ventilation inlet
4 degassing line
5 degassing outlet
6 guide arc member
7 ribs
8 flap member
9 connecting nipple
10 liquid separator
11 second ventilation line
12 second degassing line
13 fuel-gas mixture
14 gas
15 valve unit

What is claimed is:

1. A ventilation device, the ventilation device comprising:
a filler pipe;
a connecting nipple, arranged at an outer surface region of the filler pipe, the connecting nipple having arranged thereon a ventilation inlet and a degassing outlet;
a ventilation line having a first ventilation line end and a second ventilation line end opposite the first ventilation line end, the ventilation line arranged to be fluidically connected at the second ventilation line end to the filler pipe via the ventilation inlet in a manner that guides a flow of gas to the ventilation inlet so that a fuel vapor mixture falls into the filler pipe;
a degassing line fluidically connected at a first degassing line end to the filler pipe via the degassing outlet; and
a guide arc member, arranged on the connecting nipple to define a guide path for incoming vapor passing through the ventilation inlet into the filler pipe, to facilitate flow of the incoming vapor between an inner wall of the filler pipe and the guide arc member along a periphery of the filler pipe along a periphery of the filler pipe such that a gaseous component of the incoming vapor escapes through the degassing outlet and a liquid component of the incoming vapor flows off through the filler pipe.

2. The venting device of claim 1, wherein the guide arc comprises a plurality of ribs arranged on an outer wall thereof that faces the inner wall of the filler pipe to separate the liquid component from the gaseous component.

3. The venting device of claim 1, wherein the cross-section of the guide arc member is substantially U-shaped or O-shaped.

4. The venting device of claim 1, further comprising a flap member, arranged in the filler pipe at the degassing outlet for movement to a closing direction which reduces or closes the degassing outlet during a refueling.

5. The venting device of claim 1, wherein the guide arc member is arranged on the connecting nipple to position a fuel-pump valve.

6. The venting device of claim 1, further comprising a liquid separator to separate liquid that flows through the ventilation line.

7. The venting device of claim 6, wherein the degassing line is arranged to be fluidically connected at a second degassing line end opposite the first degassing line end to one or more of the liquid separator.

8. The venting device of claim 7, further comprising:
a second ventilation line arranged to fluidically connect the liquid separator, and
a second degassing line to fluidically connect the liquid separator.

9. A ventilation device, comprising:
a filler pipe;
a ventilation line having a first ventilation line end and a second ventilation line end, the ventilation line arranged to be fluidically connected at the second ventilation line end to the filler pipe;
a connecting nipple arranged on an outer surface region of the filler pipe;
a ventilation inlet arranged, in an installation position, on the connecting nipple to fluidically connect the second ventilation line end to the filler pipe;
a degassing line fluidically connected at a first degassing line end to the filler pipe;
a degassing outlet arranged, in an installation position, on the connecting nipple to fluidically connect the first degassing line end to the filler pipe; and
a guide arc member, arranged on the connecting nipple to define a guide path for incoming vapor passing through the ventilation inlet into the filler pipe, to facilitate flow of the incoming vapor between an inner wall of the filler pipe and the guide arc member along a periphery of the filler pipe along a periphery of the filler pipe such that a gaseous component of the incoming vapor escapes through the degassing outlet and a liquid component of the incoming vapor flows off through the filler pipe, the guide arc having a plurality of ribs arranged on an outer wall thereof that faces the inner wall of the filler pipe to separate the liquid component from the gaseous component.

10. The venting device of claim 9, further comprising a flap member, arranged in the filler pipe at the degassing outlet for movement to a closing direction which reduces or closes the degassing outlet during a refueling.

11. The venting device of claim 9, wherein the guide arc member is arranged on the connecting nipple to position a fuel-pump valve.

12. The venting device of claim 9, further comprising a liquid separator to separate liquid that flows through the ventilation line.

13. The venting device of claim 12, wherein the degassing line is arranged to be fluidically connected at a second degassing line end opposite the first degassing line end to one or more of the liquid separator.

14. The venting device of claim 13, further comprising:
   a second ventilation line arranged to fluidically connect the liquid separator, and
   a second degassing line arranged to fluidically connect the liquid separator.

15. A ventilation device, comprising:
   a filler pipe;
   a ventilation line having a first ventilation line end and a second ventilation line end, the ventilation line arranged to be fluidically connected at the second ventilation line end to the filler pipe;
   a degassing line fluidically connected at a first degassing line end to the filler pipe;
   a connecting nipple arranged on an outer surface region of the filler pipe, the connecting nipple having arranged thereon:
      a ventilation inlet to fluidically connect the second ventilation line end to the filler pipe,
      a degassing outlet arranged to fluidically connect the first degassing line end to the filler pipe, and
      a guide arc member to define a guide path for incoming vapor passing through the ventilation inlet into the filler pipe, the guide arc member to facilitate a flow of the incoming vapor between the guide arc and an inner wall of the filler pipe along a periphery of the filler pipe such that a gaseous component of the incoming vapor escapes through the degassing outlet and a liquid component of the incoming vapor flows off through the filler pipe, the guide arc having a plurality of ribs arranged on an outer wall thereof that faces an inner wall of the filler pipe to separate the liquid component from the gaseous component; and
   a flap member, arranged in the filler pipe at the degassing outlet for movement to a closing direction which reduces or closes the degassing outlet during a refueling.

* * * * *